United States Patent
Yang

(10) Patent No.: US 7,258,554 B1
(45) Date of Patent: Aug. 21, 2007

(54) STRUCTURE FOR PREVENTING INCORRECT INSERTION OF AN INTERFACE MODULE

(75) Inventor: Chih-Wei Yang, Taipei County (TW)

(73) Assignee: Portwell Inc., Taipei (TW)

( * ) Notice: Subject to any disclaimer, the term of this patent is extended or adjusted under 35 U.S.C. 154(b) by 0 days.

(21) Appl. No.: 11/482,722

(22) Filed: Jul. 10, 2006

(51) Int. Cl.
*G06F 1/16* (2006.01)
(52) U.S. Cl. ............ 439/76.1; 361/741; 361/752; 439/680; 439/928.1
(58) Field of Classification Search .......... 439/76.1, 439/374, 680, 928.1, 297, 681; 361/725, 361/726, 727, 685, 686, 741, 802, 730, 752
See application file for complete search history.

(56) References Cited

U.S. PATENT DOCUMENTS

| | | | |
|---|---|---|---|
| 3,662,224 A * | 5/1972 | Rauch .................. | 361/741 |
| 4,388,671 A * | 6/1983 | Hall et al. ............. | 361/682 |
| 4,389,080 A * | 6/1983 | Clark et al. ........... | 439/62 |
| 4,720,004 A * | 1/1988 | Voegeli ................ | 361/686 |
| 4,801,924 A * | 1/1989 | Burgmann et al. ..... | 340/521 |
| 4,821,150 A * | 4/1989 | Duthie et al. ......... | 361/736 |
| 5,408,384 A * | 4/1995 | Gannyo et al. ........ | 361/737 |
| 6,215,666 B1* | 4/2001 | Hileman et al. ....... | 361/752 |
| 6,304,436 B1* | 10/2001 | Branch et al. ......... | 361/683 |
| 6,385,053 B1* | 5/2002 | Parizi et al. .......... | 361/786 |
| 6,545,877 B1* | 4/2003 | Agha et al. ........... | 361/801 |
| 6,768,638 B2* | 7/2004 | Shih ..................... | 361/685 |
| 6,831,832 B2* | 12/2004 | Haager et al. ........ | 361/685 |
| 6,927,983 B1* | 8/2005 | Beseth et al. ......... | 361/796 |
| 6,986,679 B1* | 1/2006 | Aronson et al. ....... | 430/374 |

* cited by examiner

*Primary Examiner*—Neil Abrams
(74) *Attorney, Agent, or Firm*—Bacon & Thomas, PLLC

(57) ABSTRACT

A foolproof structure for preventing incorrect insertion an interface module is a PCI-Express (PCI-E) interface structure having at least one module stand disposed in a casing and a corresponding fixing frame. The fixing frame includes a first structure corresponding to the module stand, and the module stand includes different interface cards for converting PCI-E signals into different telecommunication signals. A second structure is disposed in a connecting end of the motherboard in the casing. The first and second structures can be used for preventing a wrong connection between the interface card, module stand and motherboard, so as to avoid damages to the electronic components and assure the normal operation of the foregoing modules. The first and second structures may include a pair of indents formed in the base of the module stand with one indent to closely engage a protrusion of the fixing frame and the other indent to closely engage a protrusion adjacent an edge of the motherboard when the module stand is inserted into the correct fixing frame.

6 Claims, 4 Drawing Sheets

STRUCTURE FOR PREVENTING INCORRECT INSERTION OF AN INTERFACE MODULE

BACKGROUND OF THE INVENTION

1. Field of the Invention

The present invention relates to a foolproof structure for an interface module, and more particularly to a foolproof structure that prevents a PCI Express (PCI-E) interface from being connected incorrectly and assures the PCI-E interface to be connected to a correction position.

2. Description of the Related Art

PCI Express (PCI-E) was originally developed by Intel and is considered as a new wideband I/O interface that can replace the PCI. The most significant improvement made by the PCI Express resides on its node-to-node topology that allows inverters to share the resources (such as the bus bandwidth) for the connected PCI Express devices according to their priorities. Each of the devices can be accessed or connected to the inverter directly and independently. Further, the inverter processes the transmitted data in the first priority, so that instant application programs can access the inverters immediately.

Another improvement over the PCI resides on the higher bandwidth of the PCI Express. A single channel can transmit 250 MB of data per second in a one-way transmission (and 500 MB per second for the two-way transmission), and the present PCI Express provides five formats (x1, x2, x3, x4 and x16) for the use of different bandwidths. The PCI Express (x2) comprises two channels, and the maximum one-way and two-way bandwidths are 500 MB per second and 1000 MB per second respectively.

Due to the compatibility issue of the PCI-E specification and electronic signals, the left and right sides of the modules are not compatible, and thus the I/O modules cannot be drawn out if they are installed improperly. Therefore, users have to remember which side of the module should be inserted before electronic signals can be connected properly. Further, a module cannot be inserted into the insert slot of a motherboard with a different specification. For instance, a module with a PCI-E (x4) specification should not be inserted into a motherboard with a PCI-E (x8) specification, or else the PCI-E specification and electronic signals will be incompatible, and improper operations or damages to the I/O module may result.

SUMMARY OF THE INVENTION

In view of the shortcomings of the prior art, the inventor of the invention based on years of experience in the related industry to conduct extensive researches and experiments, and finally developed a foolproof structure for an interface module in accordance with the present invention.

Therefore, it is a primary objective of the present invention to provide a feasible solution and overcome the foregoing problems by providing a foolproof structure for an interface module. The foolproof structure is installed in casing, and a motherboard is installed in the casing. The casing includes two or more fixing frames disposed proximate to the motherboard, and another end of the fixing frame is fixed onto a distal surface of the casing. A module stand is installed in each fixing frame, and the module stand has a first foolproof module disposed on the fixing frame and proximate to a corresponding distal edge of the motherboard. The position of the first foolproof module can be changed according to the installation direction of the module stand. Further, the module stands installs different modules of interface cards, and these interface cards can convert different PCI-E telecommunication signals into different communication signals. Further, the motherboard includes a second foolproof module disposed at a distal edge connected to the insert slot and a distal edge of the module stand. The position of the second foolproof module can be changed according to the specification of the insert slot. In an installation, the first foolproof module is used to insert the module stand correctly into the fixing frame, and then the second foolproof module is used to insert the interface card of the fixing frame correctly into the insert slot of the motherboard, so as to prevent the module stand from being installed to a wrong position, and thus a different module stand will not be installed to a wrong fixing frame. Further, the invention prevents the interface card from being inserted into a wrong insert slot, so as to avoid the incapability of sending different electronic signals or an error of sending wrong messages, and also protects the foregoing modules from being damaged.

Another objective of the present invention is to provide a foolproof structure for an interface module, wherein the interface card installs a port disposed at an end away from the motherboard for connecting an external device. Further the module stand includes an opening for accommodating the port, so that the port can be exposed from the surface of the casing.

BRIEF DESCRIPTION OF THE DRAWINGS

The objective, shape, structure, characteristic and effect of the present invention will now be described in more detail with reference to the accompanying drawings that show various embodiments of the invention, in which.

DETAILED DESCRIPTION OF THE PREFERRED EMBODIMENTS

Figure 1:
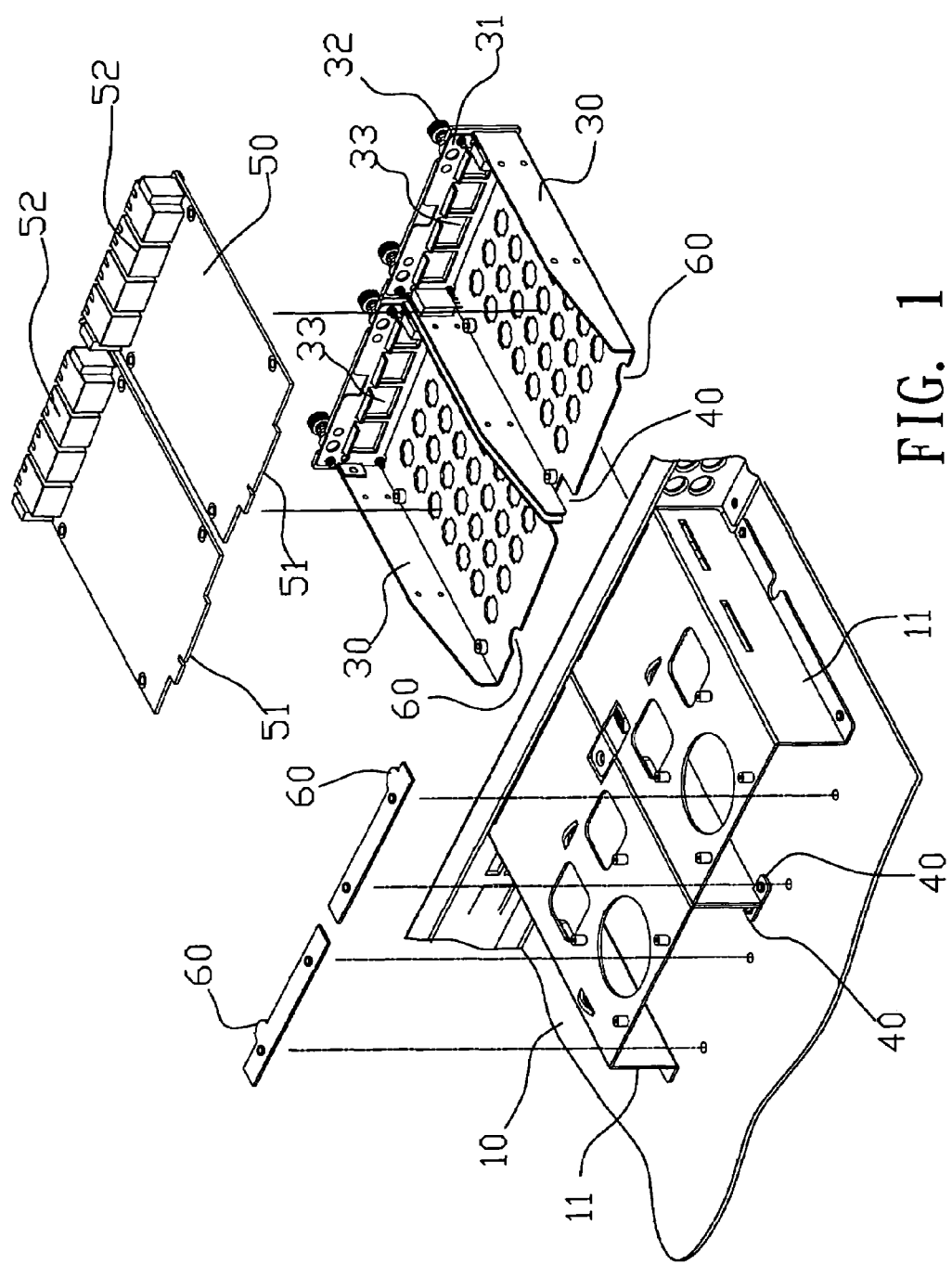
FIG. 1 is an exploded view of the invention.
Figure 2:
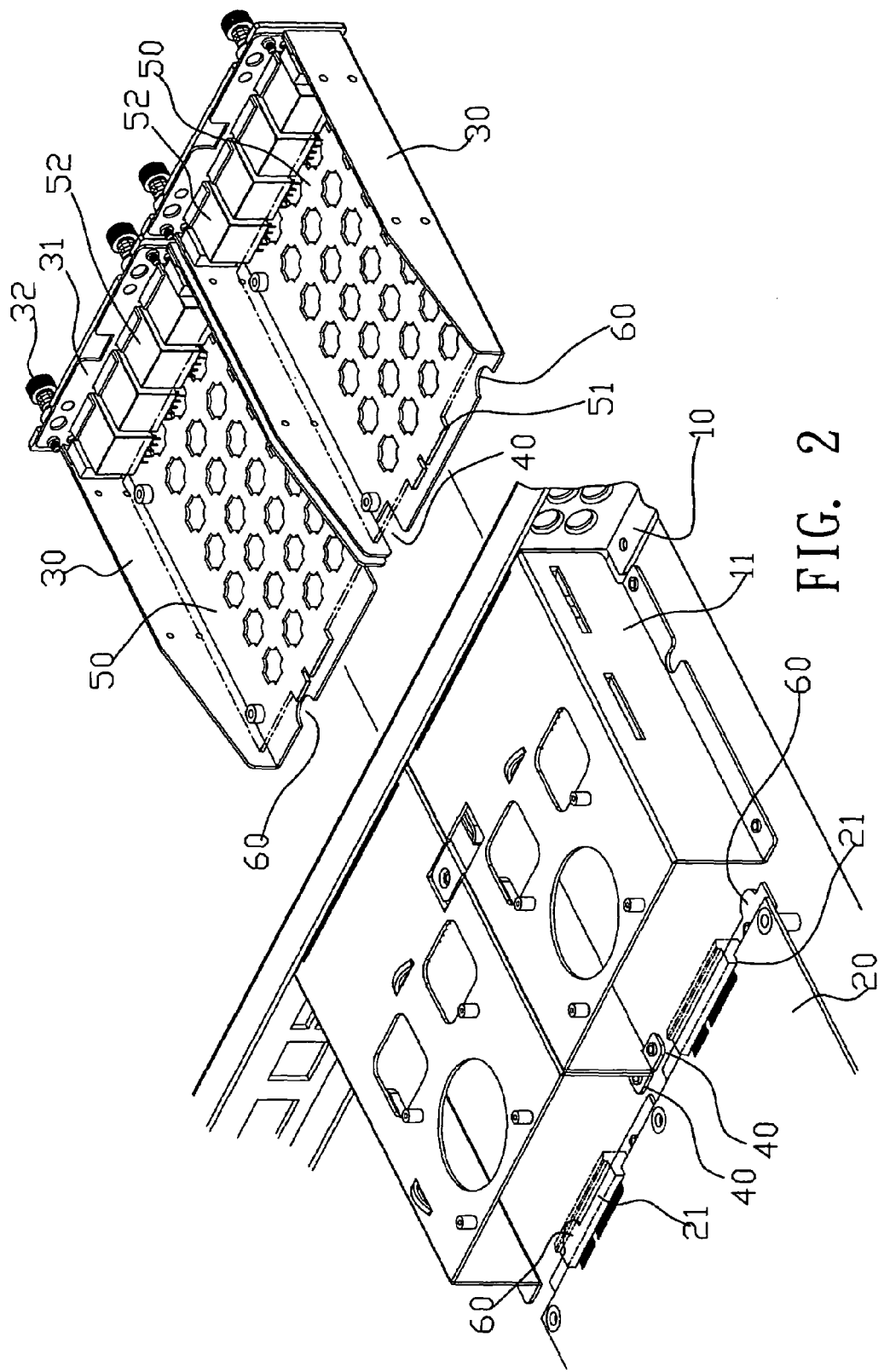
FIG. 2 is a schematic view of installing a fixing frame and a module stand of the invention.
Figure 3A:
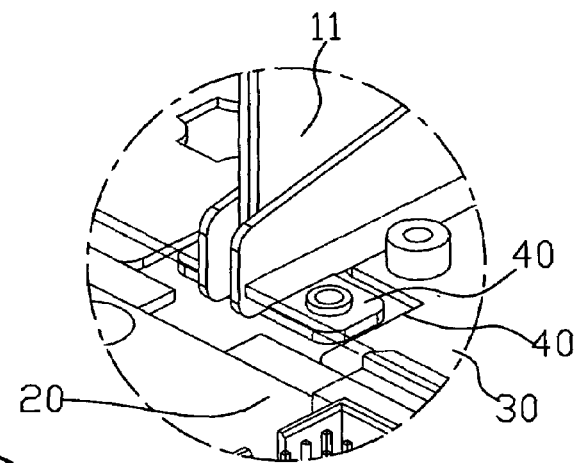
FIG. 3A is an enlarged view of a first foolproof module of the invention.
Figure 3:
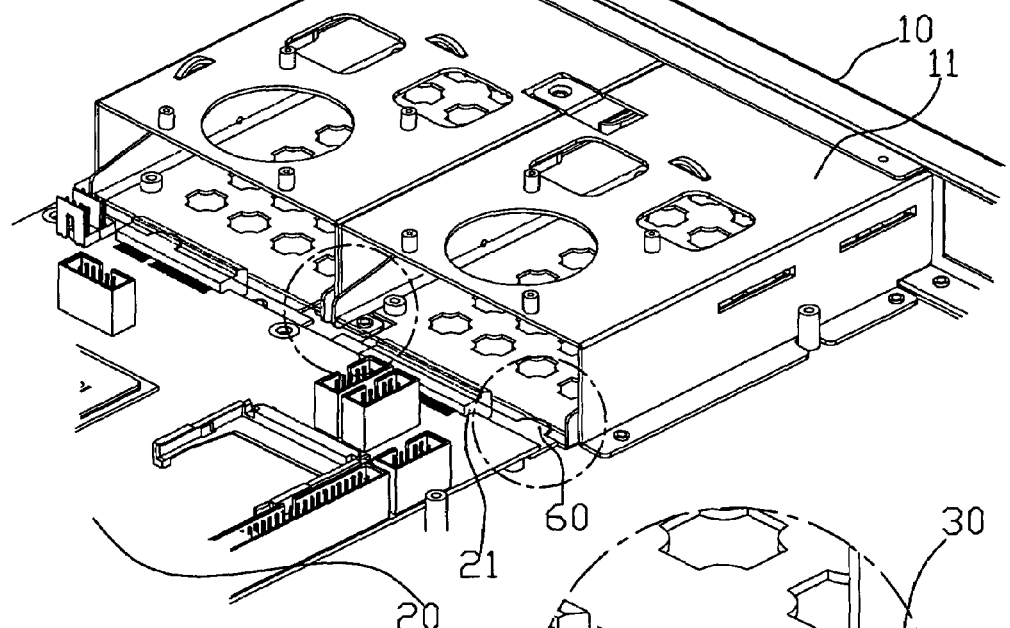
FIG. 3 is a schematic view of a correct installation of the invention.

Referring to FIGS. 1, 2 and 3 for a foolproof structure for an interface module of the present invention, the foolproof structure is installed in a casing 10 which is a rectangular computer casing. The casing 10 installs a motherboard 20, and the motherboard 20 has at least one insert slot 21 disposed at an edge of the motherboard 20, and the insert slots 21 are compatible with the PCI-E specification.

Further, the casing 10 includes two or more adjacent fixing frames 11 disposed proximate to the motherboard 20, and the fixing frame 11 in this embodiment is an inverted U-shape frame. Another end of the fixing frame 11 is fixed onto a distal surface of the casing 10, and the fixing frame 11 includes a module stand 30. A first foolproof module 40 is disposed at the module stands 30 and the fixing frames 11 and proximate to the corresponding distal edge of the motherboard 20, and the first foolproof module 40 in this embodiment is comprised of a rectangular indent and a rectangular protrusion. The position of the first foolproof module 40 can be changed according to the installation direction of the module stand 30. In this embodiment, the first foolproof module 40 is divided into a left module and a right module, wherein the left module is installed to the right side of the first foolproof module 40 and the right module is installed to the left side of the first foolproof module 40. The module stand 30 include a sideboard 31 disposed at another end away from the motherboard 20. The sideboard 31 includes a screw rod 32 secured onto a distal surface of the casing 10, such that the module stand 30 is fixed into the casing 10, and the sideboard 31 includes an opening 33.

Further, different modules interface cards 50 are installed to the module stands 30 and these interface cards 50 can convert different PCI-E telecommunication signals into different communication signals (such as USB, IEEE1394, and SATA signal, and an interface 51 (which is a goldfinger in this embodiment) is installed between the interface card 50 and the corresponding edge of the motherboard 20, and the interface 51 can be inserted precisely into the insert slot 21. Further, the motherboard 20 installs a second foolproof module 60 at an edge of the insert slot 21 and an edge of the module stand 30, and the second foolproof module 60 of this embodiment is comprised of a plate with a circular arc protrusion, and a circular arc indent (as shown in FIG. 3). The position of the second foolproof module 60 can be changed according to the specification of the insert slot 21. In this embodiment, a different interface card 50 is installed separately on a left side and a right side, and a port 52 is provided on the interface card 50 and disposed at an end away from the motherboard 20 for connecting an external device. The port 52 can be passed through the opening 33 and exposed from the surface of the casing 10.

Figure 3B:
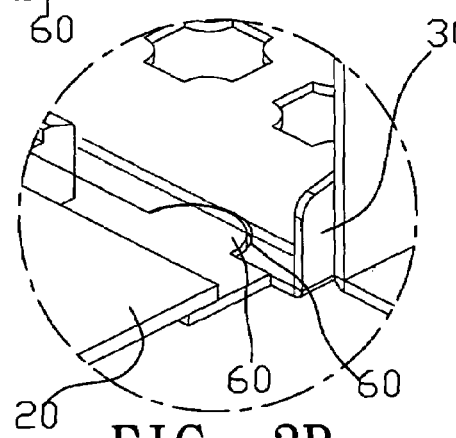
FIG. 3B is an enlarged view of a second foolproof module of the invention.
Figure 4:
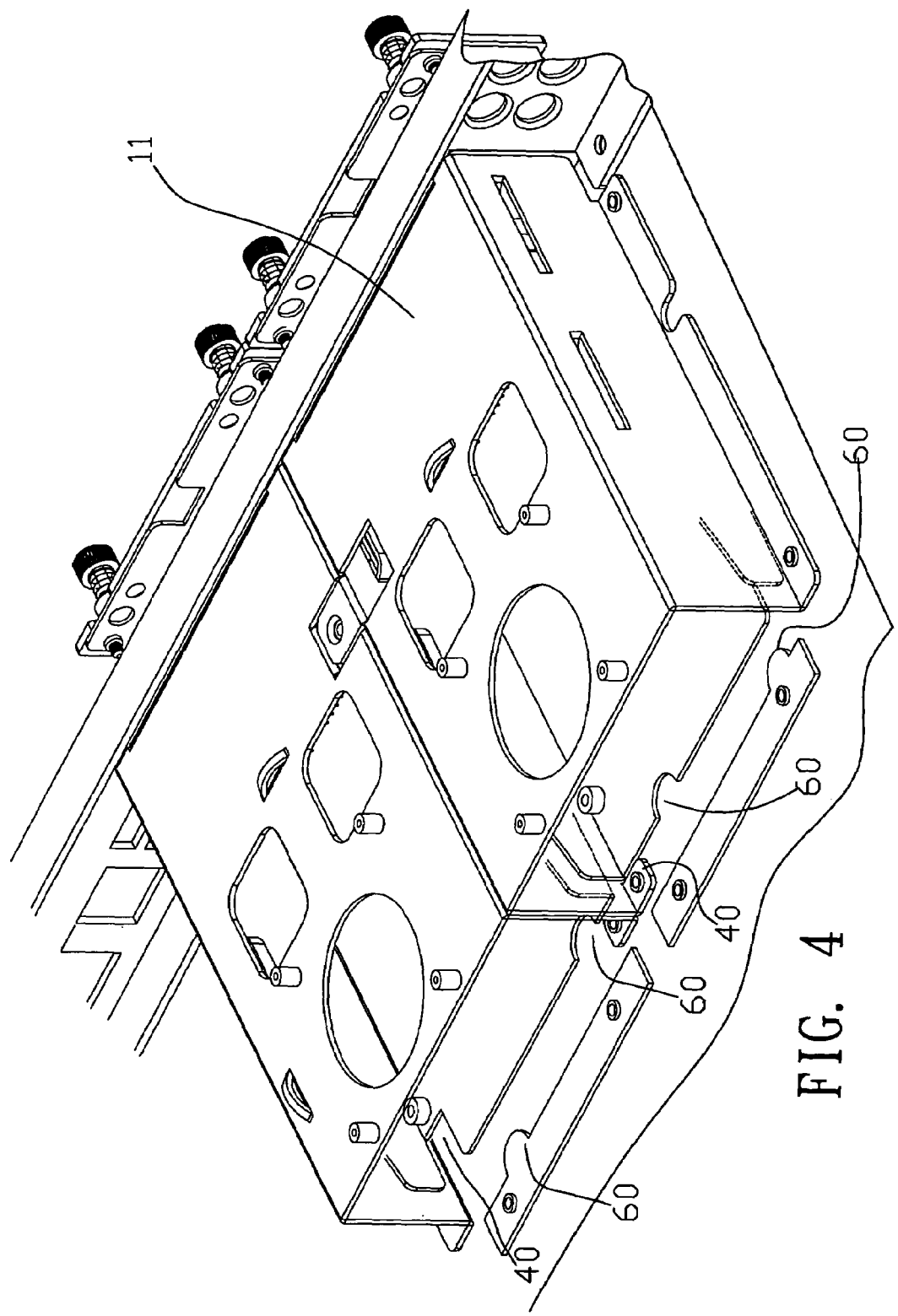
FIG. 4 is a schematic view of an incorrect installation of the invention.

Referring to FIGS. 2, 3, 3A and 3B for the installation, a first foolproof module 40 is used to insert different module stands 30 correctly into the fixing frame 11 (as shown in FIG. 3A), and the second foolproof module 60 is used to insert the interface 51 of the interface card 50 in the fixing frame 11 correctly into the insert slot 21 of the motherboard 20 (as shown in FIG. 3B). Therefore, the invention can prevent the module stand 30 from being inserted into a wrong position, so that a different module stand 30 will be inserted into a wrong fixing frame 11. The invention also prevents the interface card 50 from being inserted into a wrong insert slot 21 (as shown in FIG. 4), so as to avoid the incapability of sending different electronic signals or an error of sending wrong messages, and also protects the foregoing modules from being damaged.

In view of the foregoing preferred embodiments, the design in accordance with the present invention can improve the efficient of the interface and overcome the shortcomings of the prior art. In summation of the description above, the object, shape, structure of the present invention are novel and improve over the prior art and thus is duly submitted for the patent application. While the invention has been described by means of specific embodiments, modifications and variations could be made by those skilled in the art without departing from the scope and spirit of the invention set forth in the claims.

What is claimed is:

1. A foolproof structure for an interface module, comprising:
    a casing;
    at least one fixing frame, installed at a distal surface proximate to said casing;
    a motherboard, installed at a position proximate to said fixing frame and having an insert slot disposed at said motherboard and proximate to a distal edge of said fixing frame;
    at least one module stand, inserted into said fixing frame;
    at least one interface card, fixed onto said module stand for converting different PCI-E telecommunication signals into various different telecommunication signals;
    a first foolproof module, installed on said fixing frame and at a position corresponding to said module stand, and the position of said first foolproof module can be changed according to the installation direction of said module stand;
    a second foolproof module, installed on said module stand and at a position corresponding to said motherboard, and the position of said second foolproof module can be changed according to the specification of said insert slot;
    thereby, when the foregoing components are installed, said first foolproof module assures said module stand to be inserted correctly into said fixing frame, and said second foolproof module assures said interface card in said fixing frame to be inserted correctly into said insert slot of said motherboard, so as to prevent said module stand from being inserted into a wrong position or prevent a different module stand from being inserted into a wrong fixing frame, or prevent said interface card from being inserted into a wrong insert slot.

2. The foolproof structure for an interface module of claim 1, wherein said insert slot is compatible with the specification of PCI-E.

3. The foolproof structure for an interface module of claim 1, wherein said first foolproof module is comprises of a rectangular indent and a rectangular protrusion.

4. The foolproof structure for an interface module of claim 1, wherein said interface card includes an interface disposed at a corresponding edge of said motherboard and inserted precisely into said insert slot.

5. The foolproof structure for an interface module of claim 1, wherein said second foolproof module is comprised of a circular arc protrusion and a circular arc indent.

6. The foolproof structure for an interface module of claim 1, wherein said interface card includes a port disposed at an end away from said motherboard for connecting to an external device.

* * * * *